US005716682A

United States Patent [19]

Lovison et al.

[11] Patent Number: 5,716,682

[45] Date of Patent: Feb. 10, 1998

[54] THREE DIMENSIONAL CARD

[75] Inventors: Douglas I. Lovison, Rancho Sante Fe; James H. Esker, San Diego, both of Calif.

[73] Assignee: S & G Chromium Graphics, Carlsbad, Calif.

[21] Appl. No.: 568,000

[22] Filed: Dec. 6, 1995

[51] Int. Cl.[6] .......... B32B 3/30

[52] U.S. Cl. .......... 428/30; 40/454; 156/277

[58] Field of Search .......... 428/29, 30, 38, 428/7, 13; 49/454; 156/277

[56] References Cited

U.S. PATENT DOCUMENTS

| | | | |
|---|---|---|---|
| 1,694,847 | 12/1928 | Donaldson | 428/203 |
| 3,264,164 | 8/1966 | Jerothe et al. | 428/29 |
| 3,268,238 | 8/1966 | Finkel | 40/427 X |
| 3,538,632 | 11/1970 | Anderson | 40/427 |
| 4,032,679 | 6/1977 | Aoyagi | 428/42.3 |
| 4,127,689 | 11/1978 | Holt | 428/38 |
| 4,499,126 | 2/1985 | Suzuki et al. | 428/13 |
| 4,597,210 | 7/1986 | Kitrell | 40/542 |
| 4,721,635 | 1/1988 | Helinski | 428/15 |
| 4,933,218 | 6/1990 | Longobardi | 428/38 |
| 5,082,703 | 1/1992 | Longobardi | 428/38 |
| 5,106,126 | 4/1992 | Longobardi et al. | 40/582 X |
| 5,223,357 | 6/1993 | Lovison | 428/13 X |
| 5,407,711 | 4/1995 | Lovison et al. | 428/13 |

FOREIGN PATENT DOCUMENTS

| | | |
|---|---|---|
| 0 663 603 A1 | 7/1995 | European Pat. Off. . |
| 08 022 091 | 1/1996 | Japan . |
| 2 206 227 | 12/1988 | United Kingdom . |
| WO 87/04287 | 7/1987 | WIPO . |

*Primary Examiner*—Henry F. Epstein
*Attorney, Agent, or Firm*—Nydegger & Associates

[57] ABSTRACT

A sign and a method for its manufacture include a lenticular split image which is process printed onto the second surface of a lenticular lens layer. Additionally, selected portions of the image are masked by a lenticular split covering, and a reflective layer is mounted against the lenticular lens layer, with the image and the covering therebetween. This gives a shiny appearance to the unmasked portions of the image and gives a flat appearance to the masked portions of the image. The lenticular split image and the lenticular split covering each respectively include a plurality of separate images and a plurality of separate aspects which include a plurality of strips. In order to obtain a 3-D effect for the sign, the plurality of lenses in the lenticular lens layer are aligned in register with the corresponding juxtaposed strips of both the lenticular split image and the lenticular split covering.

20 Claims, 3 Drawing Sheets

Figure 1
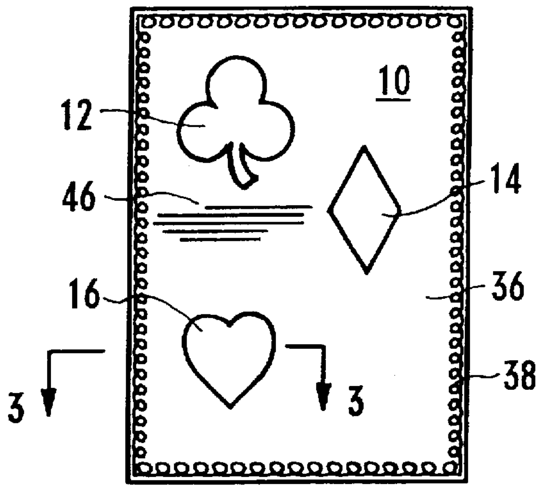
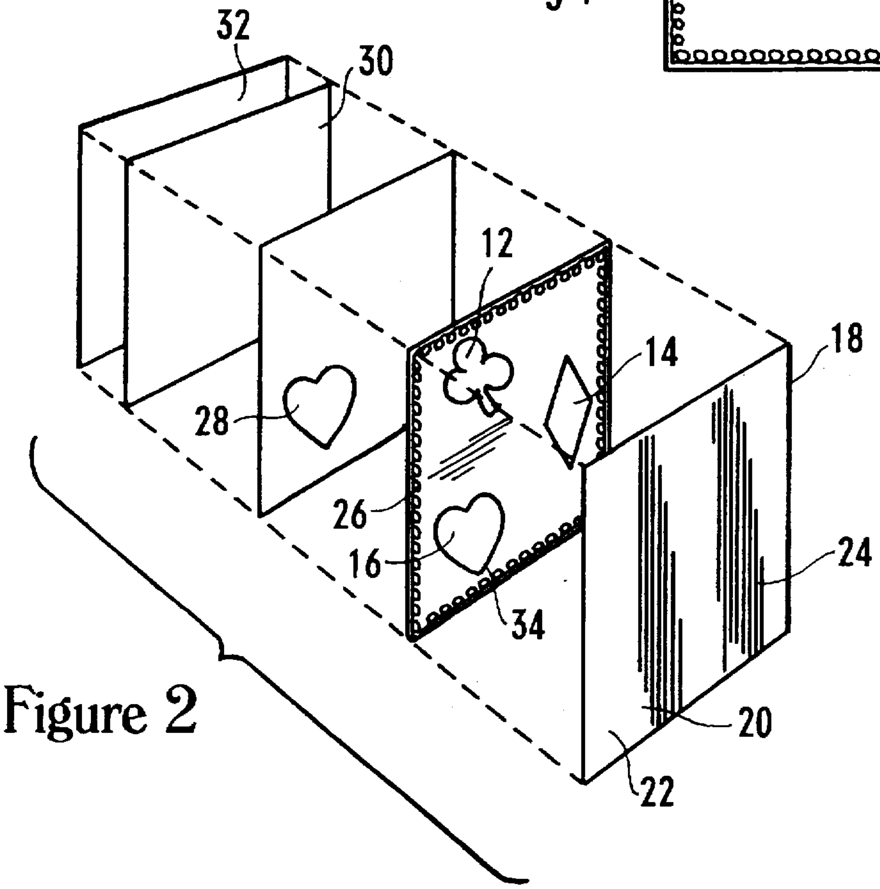
Figure 2
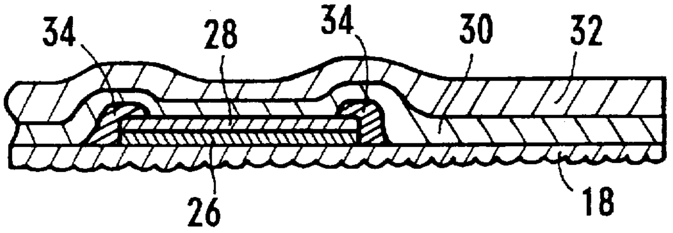
Figure 3

THREE DIMENSIONAL CARD

FIELD OF THE INVENTION

The present invention pertains generally to signs and trading cards. More particularly, the present invention pertains to flat signs which present a three dimensional impression. The present invention is particularly, but not exclusively, useful as a sign which presents the image of an object with both a three dimensional impression and a variation in visual texture which includes both a shiny and a flat appearance.

BACKGROUND OF THE INVENTION

The effectiveness of signage to disseminate information is in large part dependent on the attractiveness and visual presentation that is provided by the sign. For most applications, it is necessary, or desirable, to have attractive and eye-catching signage. This is so regardless whether the purpose of the sign is to merely entertain viewers or to entice someone into purchasing a particular product or service. In attempts to make a particular sign distinctive and memorable, various techniques have been employed to create a notable visual impression with the sign and to thereby further its purpose.

A distinctive visual effect which has often been employed in signage involves giving the sign a three dimensional (3-D) appearance. Indeed, various techniques for creating such an appearance have been used. A general overview of these efforts is presented in an article written by Alfred DeBat entitled "A brief history of 3-D photography". This particular article appeared in the July 1992 edition of Professional Photographer.

Another distinctive visual effect that has recently appeared in various commercial signs, and particularly on trading cards, involves visual texturing which gives signage a mix of both shiny and flat appearances. This particular effect is taught and disclosed in U.S. Pat. No. 5,106,126 which issued to Longobardi et al. for an invention entitled "Process Printed Image with Reflective Coating" which is assigned to the same assignee as the present invention. Yet another distinctive visual effect which has been successfully incorporated into signage is disclosed in U.S. Pat. Nos. 4,933,218 and 5,082,703 which both issued to Longobardi for an invention entitled "Sign with Transparent Substrate", and which are assigned to the same assignee as the present invention. This effect is a 3-D depth enhancement which is achieved by depositing an extraordinarily thick ridge of ink onto selected portions of an image.

While the above mentioned technologies are exemplary of developments which have individually added to the attractiveness and effectiveness of signage, the present invention recognizes that the combination of various technologies in the manufacture of a single sign can also improve the appeal of signage. Specifically, the present invention recognizes that several technologies can be effectively combined in the manufacture of a flat sign with a three dimensional appearance that causes the separate technologies to complement each other.

In light of the above it is an object of the present invention to provide a flat sign which has a 3-D appearance that includes variations in its visual texture. Another object of the present invention is to provide a flat sign which has a 3-D appearance that includes depth enhancements. Still another object of the present invention is to provide a method for manufacturing a flat sign with a 3-D appearance which has variations in the appearance that include different visual textures and enhancements in depth perception. Another object of the present invention is to provide a flat sign with a 3-D appearance that is relatively easy to manufacture and comparatively cost effective.

SUMMARY OF THE INVENTION

A sign, such as a trading card, includes a clear lenticular lens layer which has an image made of light transmissive inks that is process printed onto the second surface of the lens layer. Specifically, for the present invention the process printed image is a lenticular split image. As used here, the descriptor "lenticular split" indicates that the so-described visualization of an object (e.g. image, design) is actually a composite of several separate visualizations. Specifically, each of the separate visualizations that together make up the lenticular split visualization include a plurality of strips, and these strips are located in an ordered juxtaposition with the strips of other separate visualizations to create the lenticular split visualization.

A lenticular split covering, preferably made of an opaque white ink, is deposited onto selected portions of the lenticular split image to mask portions of the image. Thus, the lenticular split image can have both masked and unmasked portions. A reflective layer of metallized mylar is then laminated against the lenticular lens layer with both the lenticular split image and the lenticular split covering positioned therebetween. The result is that the unmasked portions of the lenticular split image will have a shiny appearance, and the masked portion of the lenticular split image will have a relatively flat appearance.

For added visual effect, an extraordinarily thick ridge of light transmissive ink can be deposited onto the second surface of the lenticular lens layer together with the lenticular split image. This extraordinarily thick ridge of ink can be specifically deposited directly onto any design that may be incorporated into the image, or along the edge of the design. For purposes of the present invention, the thickness of the extraordinarily thick ridge of ink will be at least three times thicker than the thickness of a normally process printed ink.

For reasons well known in the pertinent art, when a lenticular lens layer is placed in register over a lenticular split image, the result is a visualization having an apparent three dimensional effect. For the present invention, this three dimensional effect is enhanced by variations in the visual texture of the visualization that result from placement of the lenticular split covering. Specifically, for the sign of the present invention, the visualization is presented with some portions of the lenticular image which are unmasked and therefore shiny, and other portions of the lenticular split image which are masked and therefore flat in appearance. Additionally, some parts of the visualization can be given depth enhancement by being high-lighted with an extraordinarily thick ridge of ink.

In the manufacture of a sign according to the present invention, picture parts of the object to be presented on the sign are differentiated and, according to the desired three dimensional effect for the sign, are arranged to have different depth distances from a camera position. The object is then photographed with the camera from several different particularly selected perspective viewpoints. This is done with a lenticular lens on the camera to create individually separate images of the object from each viewpoint. Each of these separate images of the object includes split strips which are located in an ordered juxtaposition with strips from the other separate images. Together, these strips create the lenticular split image of the object which is then process printed onto the second surface of a clear lenticular lens.

In a manner similar to that described above for the lenticular split image, a lenticular split covering is also prepared. To do this, those portions of the various object parts that are to have a generally flat appearance are first selected and identified. Negatives of these selected portions are then arranged to have the same depth distance from the camera position that was previously established for the particular portion of the object that is to be covered. The negatives are then photographed with the camera from the same different particularly selected perspective viewpoints as were previously used in the preparation of the lenticular split image. As with the image itself, separate aspects of the covering are created. Each of these separate aspects of the covering include strips which are located in an ordered juxtaposition with corresponding strips from the other separate aspects. This creates the lenticular split covering. The lenticular split covering is then process printed with a white opaque ink onto those portions of the lenticular split image which are to be masked.

As indicated above, an extraordinarily thick ridge of ink can be deposited onto selected areas of the lenticular split image. For purposes of the present invention, the extraordinarily thick ridge of ink is deposited using a silk screen process and is positioned, as desired, onto designs in the lenticular split image or at the edge of such designs.

A reflective layer, preferably made of a metallized mylar, is then laminated against the lenticular lens layer with the lenticular split image, the lenticular split covering, and the extraordinarily thick ridge of ink positioned between the reflective layer and the lenticular lens layer. This reflective layer will give a shiny appearance to the unmasked portions of the lenticular split image but will not affect the flat appearance which is given to those portions of the lenticular split image that are masked by the lenticular split covering. Further, a backing sheet can be attached to the reflective layer opposite the lenticular lens layer to give stiffness to the sign and to present another surface on which information may be printed.

The novel features of this invention, as well as the invention itself, both as to its structure and its operation will be best understood from the accompanying drawings, taken in conjunction with the accompanying description, in which similar reference characters refer to similar parts, and in which:

BRIEF DESCRIPTION OF THE DRAWINGS

FIG. 1 is a front elevational view of a sign according to the present invention;

FIG. 2 is a perspective exploded view of the sign;

FIG. 3 is a cross sectional view of the sign as seen along the line 3—3 in FIG. 1;

DESCRIPTION OF THE PREFERRED EMBODIMENTS

Figure 4:
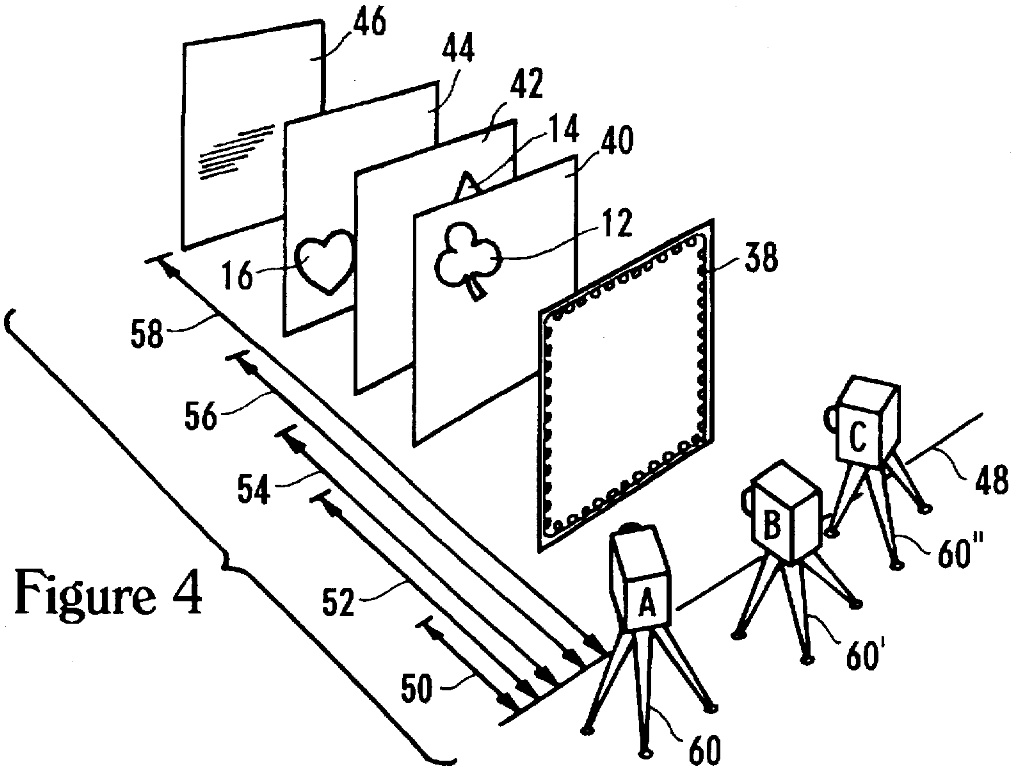
FIG. 4 is a schematic view photographic set-up for the image of an object that has been differentiated into parts and arranged on planes at predetermined respective depth distances from selected camera positions.

Referring initially to FIG. 1, a sign according to the present invention is shown and generally designated 10. As will be appreciated, sign 10 can actually be any medium, such as a picture, a design, a placard or a trading card which visually presents information for the viewer. Further, sign 10 can present any image or design of any object that is to be presented by the sign 10 for viewing. For purposes of disclosure of the present invention, sign 10 is shown with the image of design of a clover leaf 12, a diamond 14 and a heart 16.

As perhaps best seen in FIG. 2, the sign 10 includes several components. One such component is a lenticular lens layer 18 which is preferably made of a clear plastic, and which has a first surface 20 and a second surface 22. The distinction between first surface 20 and second surface 22 being that a viewer will look onto the first surface 20 when viewing the sign 10. Second surface 22 will thus be behind first surface 20. Further, the lenticular lens layer 18 includes a plurality of generally semi-cylindrical convex shaped lenses 24 which are linearly aligned side-by-side in juxtaposition on the first surface 20 of lenticular lens layer 18. For the purposes of the present invention, when measured in a direction perpendicular to the length of the individual lenses 24, there should be somewhere between fifty and one hundred and fifty lenses 24 per inch. As is well known in the art, the actual number of lenses 24 per inch can vary somewhat according to the desires of the manufacturer.

FIG. 2 also shows that the sign 10 includes a lenticular split image 26. Specifically, for sign 10, the lenticular split image 26 includes images (or designs) of the clover leaf 12, the diamond 14, and the heart 16. The actual composition of lenticular split image 26 is discussed in great detail below. Suffice it to say, at least for the time being, that lenticular split image 26 is made of any light transmissive inks, i.e. transparent or translucent inks, which are well known in the pertinent art. Further, as indicated in FIG. 2, and in FIG. 3, the lenticular split image 26 is deposited directly onto second surface 22 of lenticular lens layer 18.

Still referring to FIG. 2, it will be seen that sign 10 includes a lenticular split covering 28 which, for purposes of discussing the present invention, is shaped in the likeness of heart 16. As intended for the present invention, lenticular split covering 28 is made of an opaque ink (e.g. white ink) and is deposited against the second surface 22 of lenticular lens layer 18. Lenticular split covering 28, however, is deposited on top of lenticular split image 26 to place the lenticular split image 26 between lenticular split cover 28 and lenticular lens layer 18.

As shown in FIG. 2, lenticular split covering 28 includes only a likeness of the heart 16. There is no corresponding likeness for either the clover leaf 12 or the diamond 14. Consequently, that portion of the lenticular split image 26 which includes the heart 16 will be masked by the lenticular split covering 28. On the other hand, those portions of the lenticular split image which include the clover leaf 12 and the diamond 14 will be unmasked. For reasons to be subsequently discussed, the difference between the masked portions of lenticular split image 26 (i.e. heart 16) and the unmasked portions of lenticular split image 26 (i.e. clover leaf 12 and diamond 14) gives a visual texturing to sign 10.

The visual texturing referred to above occurs because sign 10 further includes a reflective layer 30. Specifically, the reflective layer 30 is preferably a metallized mylar which is laminated against the second surface 22 of lenticular lens layer 18 with both the lenticular split image 26 and the lenticular split cover 28 located therebetween. Although metallized mylar is suggested here, it is to be appreciated that any material which will provide a specular reflection (i.e. shiny or mirror-like reflection) will be suitable for purposes of the present invention. The result is that light will pass through the light transmissive inks of lenticular split image 26 and reflect from either the opaque ink of lenticular split covering 28 (masked portions of lenticular split image 26) or from the reflective layer 30 (unmasked portions of lenticular split image 26). It happens that the light that is reflected in the masked portions will give the lenticular split image 26 a relatively flat appearance and the light that is reflected in the unmasked portions will give the lenticular split image 26 a relatively shiny appearance. It is the contrast between the shiny (unmasked) and flat (masked) portions of sign 10 that give it visual texturing.

FIG. 2 shows that sign 10 also includes a backing 32. For the present invention backing 32 can be made of any material which provides a supporting structure for sign 10. Additionally, backing 32 may be used to present printed information that can be viewed from the back of sign 10.

FIG. 3 shows an additional component for sign 10 which can be optionally included to enhance the perception of depth in sign 10 for the viewer. Specifically, this component is an extraordinarily thick ridge of ink 34 which can be selectively applied to the lenticular split image 26. For the present invention, the extraordinarily thick ridge of ink 34 is at least three time thicker than a normally process printed ink. With this in mind, the thickness of the extraordinarily thick ridge of ink 34 will generally be slightly thicker and be around fifteen or twenty microns. Typically, the extraordinarily thick ridge of ink 34 will be applied onto the lenticular split image using a well known silk screening process.

As shown in FIGS. 1 and 3, the thick ridge of ink 34 can be applied along the edge of a design or image, such as heart 16, in the lenticular split image 26. Importantly, it is to be appreciated that an extraordinarily thick ridge of ink 34 can be applied anywhere onto the lenticular split image 26. Thus, the ridge of ink 34 can be around or across either the masked or unmasked portions of the lenticular split image 26.

In the manufacture of a sign 10, such as a trading card, the particular object to be reproduced is first analyzed with a view toward making an attractive three dimensional presentation with visual texturing enhancements. For discussion purposes, the object 36 to be considered here is the combination of images and designs for clover leaf 12, diamond 14 and heart 16 as shown in FIG. 1. Also, for discussion purposes, consider that it is desirable to show a three dimensional presentation of the object 36 wherein the clover leaf 12 will appear to be closer to the viewer than the diamond 14, and the diamond 14 will appear to be closer to the viewer than the heart 16. It may also be desirable to have a foreground which will appear dimensionally to be in from of the object 36 and a background which will appear dimensionally to be behind the object 36. Further, to enhance the visual appearance of the object 36, it may be desirably to present portions of the object 36 (e.g. clover leaf 12 and diamond 14) with a shiny appearance and portions of the object 36 (e.g. heart 16) with a flat appearance. With this in mind, consider FIGS. 4 and 5.

Figure 5:
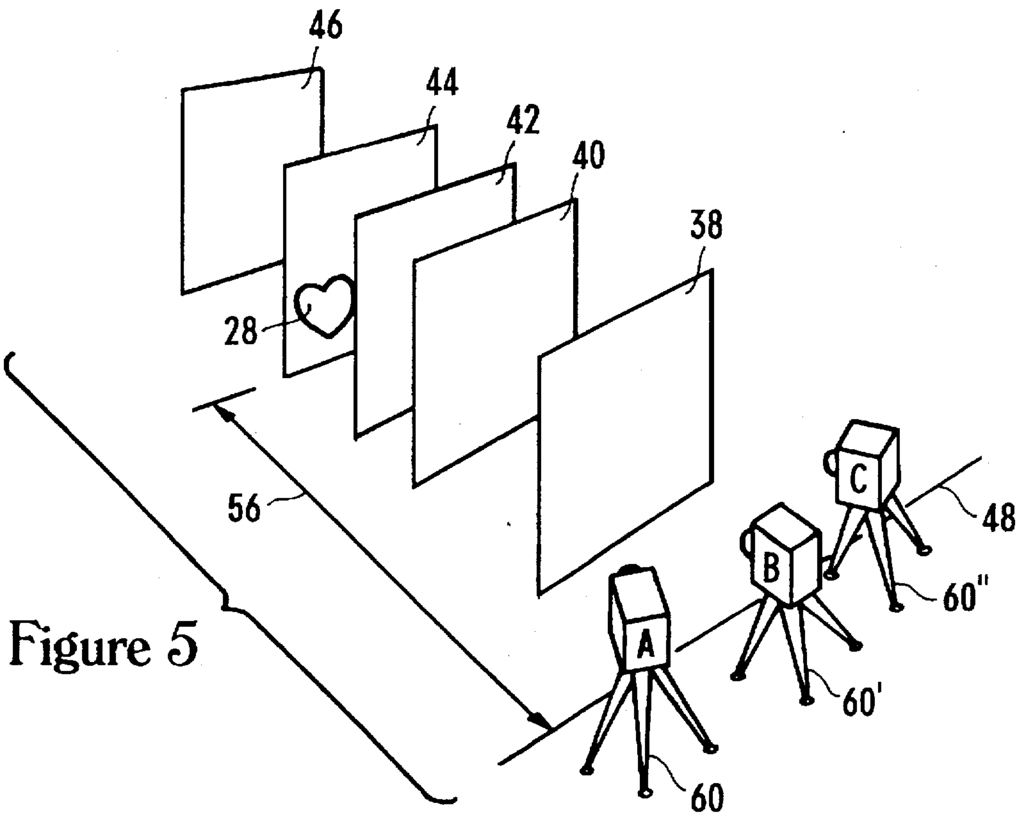
FIG. 5 is a schematic view of a photographic set-up for a covering that has been arranged on a plane at a predetermined depth distance from selected camera positions.

In general, FIG. 4 shows a photographic set-up for the preparation of lenticular split image 26 and FIG. 5 shows a photographic set-up for the preparation of lenticular split covering 28. In all important respects, both the lenticular split image 26 and the lenticular split covering 28 are prepared in substantially the same manner. The essential difference being that the image 26 and the covering 28 are different visualizations which are subsequently printed onto second surface 22 of the lenticular lens layer 18 using different kinds of inks. As indicated above, the lenticular split image 26 will be process printed onto the second surface 22 using translucent or transparent inks, and the lenticular split covering 28 will be process printed using opaque white inks.

Considering only FIG. 4, for the moment, it will be seen that the object 36 has been differentiated into three separate parts, and that the object 36 is to be presented with a foreground and a background. Specifically, FIG. 4 shows in ordered sequence from front to rear, a foreground plane 38, which in this case is a frame outline, a fore-focal plane 40 on which the clover leaf 12 is depicted, a focal plane 42 on which the diamond 14 is depicted, an aft-focal plane 44 on which the heart 16 is depicted, and a background plane 46 which is positioned at the rear. It is to be understood that there can be several fore-focal planes 40 as well as several aft-focal planes 44. The fore-focal plane 40 and the aft-focal plane 44 are merely representative. Further, it will be seen that each of the planes 38, 40, 42, 44 and 46 are arranged as desired at different depth distances from a datum line 48.

As shown in FIG. 4, the foreground 38 is presented on a plane which is located at a depth distance 50 from the datum line 48. In order, behind the foreground 38 is the fore-focal plane 40 at a depth distance 52, the focal plane 42 at a depth distance 54, and the aft-focal plane 44 at a depth distance 56. Finally, there is the background 46 at a depth distance 58. It is to be appreciated that the planes 38, 40, 42, 44 and 46 can be, in fact, transparencies on which the particular background, foreground and parts of object 36 are presented. It is to be also appreciated that all of the depth distances 50, 52, 54, 56 and 58 can each be varied for the transparencies at the respective planes 38, 40, 42, 44 and 46. Accordingly, the parts of object 36 can be arbitrarily arranged to achieve the desired three dimensional presentation for object 36.

Once the parts of object 36 are arranged as desired, a camera 60, which uses a lenticular lens (not shown), photographs the arrangement of object parts from several different perspectives. For purposes of discussing the present invention, although many perspective viewpoints can be used, only three such perspective viewpoints will be considered. These perspective viewpoints, which are identified as A, B and C, are shown in FIG. 4 and represented therein with the respectively marked camera positions 60, 60' and 60". All three viewpoints, A, B and C, are positioned along datum line 48.

In a manner well known in the pertinent art, successive camera positions 60, 60' and 60" will be used to create a composite photograph of the arrangement of object 36. First, from viewpoint A a photographic shot will be taken with the camera using its lenticular lens. Viewpoint B will then be used to photograph the arrangement from camera position 60'. And, finally, viewpoint C will be used to photograph the arrangement of object 36 from camera position 60". The result is a lenticular split image 26. Similarly, in a manner well known in the pertinent art, the object 36 can be created using computer techniques to create a composite arrangement.

Figure 6:
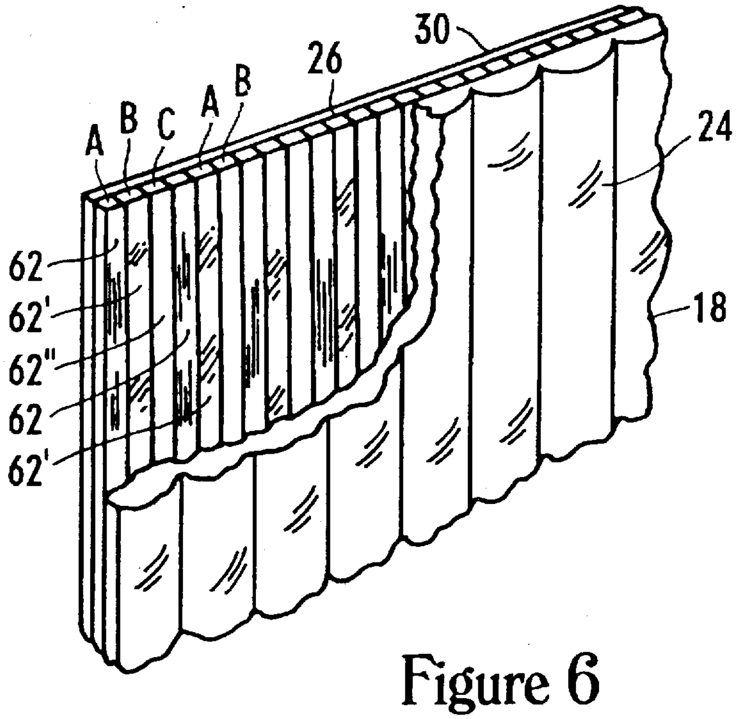
FIG. 6 is and enlarged perspective view of a section taken from the sign of the present invention with portions broken away to show the ordered juxtaposition of corresponding strips which are included in separate visualizations as recorded from the selected camera positions shown in FIG. 4 or FIG. 5.

With reference now to FIG. 6, it will be seen that lenticular split image 26, without the assistance of lenticular lens layer 18, appears to the unaided eye as a series of vertical strips 62. Specifically, the strips 62 correspond to the A camera position 60, strips 62' correspond to the B camera position 60', and the strips 62" correspond to the C camera position 60". More specifically, as best seen in FIG. 6, the strips 62, 62' and 62" are located in an ordered juxtaposition to create the lenticular split image 26. Consequently, when the lenticular lens layer 18 is positioned in register over lenticular split image 26, separate images of the object 36 from the A, B or C viewpoint will be seen depending on the angle of the viewer with respect to the lenticular lens layer 18.

Figure 7:
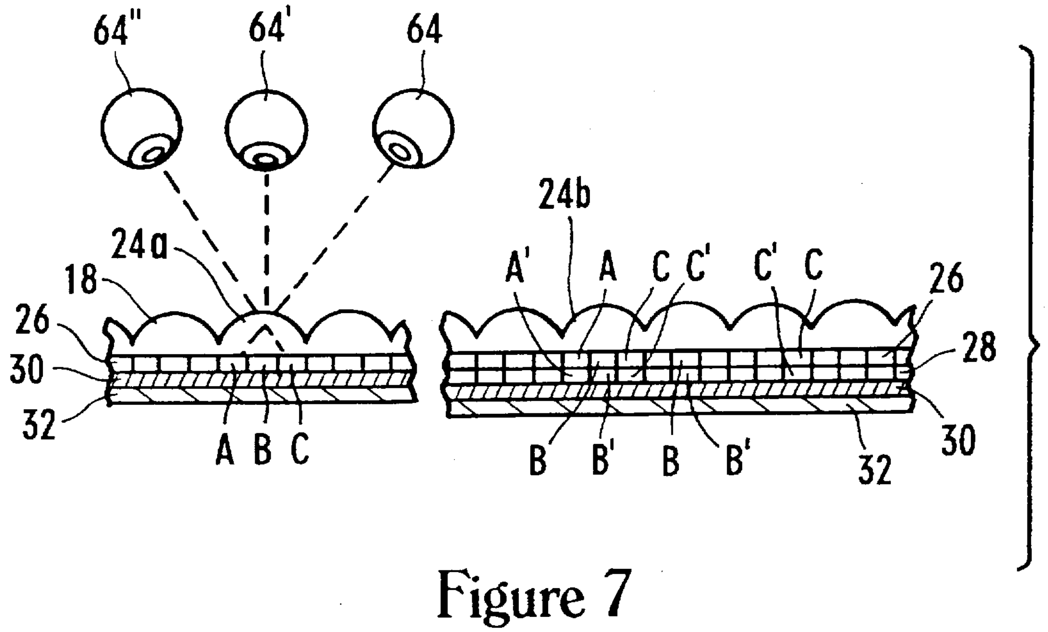
FIG. 7 is a schematic cross sectional view showing the different views observed when looking at the sign of the present invention along the line 3—3 in FIG. 1.

Referring now to FIG. 7, and particularly to the lens 24*a* which is shown therein, it will be appreciated that from eye position 64 the lens 24*a* will focus the viewer on a strip 62 which corresponds to the A portion of lenticular split image 26. On the other hand, when sign 10 is viewed from eye position 64', the lens 24*a* will focus the viewer onto strip 62' which corresponds to the B portion of lenticular split image 26. Similarly, from eye position 64", the viewer's focus will be on a strip 62" which corresponds to the C portion of lenticular split image 26. Thus, lenticular split image 26 is actually a composite of the separate images A, B, and C which, depending upon the particular eye position 64, 64', or 64", will be individually seen by the viewer. As is well known in the art, the different perspectives which are afforded by viewing different separate images of the object 36 from the various eye positions 64, 64', or 64" gives the sign 10 its perception of three dimensional depth.

The lenticular split covering 28 is also manufactured in a manner similar to that used for the manufacture of lenticular split image 26. Specifically, and referring back to FIG. 5 for the moment, that portion of object 36 which is to be masked is first identified. Here, for purposes of discussion, the covering 28 is considered for only the heart 16. Once identified, the covering 28 is located in a photographic set up as shown in FIG. 5. Importantly, the covering 28 is photographed while in the same relationship to datum line 48 as was previously used for that part of object 36 which is to be masked (e.g. heart 16). Here, the backing 28 for heart 16 is specifically located in aft-focal plane 44. Note that, although the foreground plane 38, fore-focal plane 40, focal plane 42 and background plane 46 are shown in FIG. 5, no backing 28 is shown in these planes.

Again, just as previously disclosed with regard to the lenticular split image 26, a sequence of photographs are taken of the covering 28 from camera positions 60, 60' and 60". The result is lenticular split covering 28. Lenticular split covering 28 is thus a composite of separate aspects A', B' and C' which in every respect are similar to the separate images A, B and C which constitute the lenticular split image 26.

As indicated above, the lenticular split covering 28 is process printed onto the lenticular split image 26 to give the masked portions of lenticular split image 26 a flat appearance. This effect is, perhaps, best appreciated with reference to FIG. 7, and in particular to the lens 24*b*. There it will be seen that the separate aspects A', B', and C' respectively underlay the separate images A, B and C. Consequently, these portions of lenticular split image 26 which are masked by lenticular split covering 28 will have a flat, rather than a shiny appearance.

While the particular 3-D card as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A sign which comprises:

a clear lenticular lens layer having a first surface and a second surface;

a lenticular split image, said image being made of a light transmissive ink deposited on said second surface of said layer;

a lenticular split covering, said covering being made of an opaque ink and being deposited against selected portions of said image to establish masked and unmasked portions thereof; and a reflective layer mounted against said second surface of said lenticular lens layer, with said image and said covering therebetween, to give a shiny appearance to said unmasked portions of said image and present a flat appearance to said masked portions of said image.

2. A sign as recited in claim 1 further comprising an extraordinarily thick ridge of ink deposited onto selected portions of said lenticular split image.

3. A sign as recited in claim 2 wherein said image has an edge and said extraordinarily thick ridge of ink is translucent and is deposited along said edge.

4. A sign as recited in claim 1 wherein said light transmissive ink is translucent.

5. A sign as recited in claim 1 wherein said light transmissive ink is transparent.

6. A sign as recited in claim 1 wherein said first surface of said lenticular lens layer is formed with a plurality of linearly aligned convex lenses.

7. A sign as recited in claim 6 wherein said plurality of lenses include between fifty and one hundred and fifty lenses per inch (50–150 lenses/in.).

8. A sign as recited in claim 6 wherein said lenticular split image comprises a plurality of individually separate images, with each said separate image including a plurality of strips, and with said strips of said separate images being correspondingly located in an ordered juxtaposition to create said lenticular split image.

9. A sign as recited in claim 8 wherein said lenticular split covering comprises a plurality of individually separate aspects, with each said separate aspect including a plurality of strips, and with said strips of said separate aspects being correspondingly located in an ordered juxtaposition to create said lenticular split covering.

10. A sign as recited in claim 9 wherein said plurality of lenses are aligned in register with said plurality of strips of said lenticular split image and said plurality of strips of said lenticular split covering.

11. A sign as recited in claim 1 wherein said lenticular split image is process printed onto said lenticular lens layer.

12. A sign as recited in claim 1 wherein said reflective layer is made of a metallized plastic and said reflective layer is laminated against said lenticular lens layer.

13. A sign as recited in claim 1 wherein said sign is a trading card.

14. A method for manufacturing a sign which comprises the steps of:

creating a lenticular split image which comprises a plurality of individually separate images, with each said separate image including a plurality of strips, and with said strips of said separate images being correspondingly located in an ordered juxtaposition to create said lenticular split image;

depositing said lenticular split image onto a surface of a clear lenticular lens layer;

creating a lenticular split covering which comprises a plurality of individually separate aspects, with each said separate aspect including a plurality of strips, and with said strips of said separate aspects being correspondingly located in an ordered juxtaposition to create said lenticular split covering;

depositing said lenticular split covering against selected portions of said lenticular split image to establish masked and unmasked portions thereof; and mounting a reflective layer against said surface of said lenticular lens layer, with said lenticular image and said lenticular split covering therebetween, to give a shiny appearance to said unmasked portions of said image and present a flat appearance to said masked portions of said image.

15. A method as recited in claim 14 wherein said lenticular split image is of an object, and wherein said method further comprises the step of making each of said individually separate images from a particularly selected perspective view of said object.

16. A method as recited in claim 15 which further comprises the steps of:

selecting portions of said object for said covering; and making each of said individually separate aspects of said covering from a particularly selected perspective view of said selected portion of said object.

17. A method as recited in claim 16 further comprising the steps of:

differentiating said object into parts; and arranging said differentiated parts of said object to establish a respective depth distance for each said part, said respective depth distance for each said part being different from said respective depth distances of other said parts.

18. A method as recited in claim 17 wherein said lenticular lens layer is formed with a plurality of linearly aligned convex lenses and said method further comprises the step of aligning said plurality of lenses in register with said plurality of strips of said lenticular split image and said plurality of strips of said lenticular split covering.

19. A method as recited in claim 16 wherein said mounting step is accomplish by laminating said reflective layer against said surface of said lenticular lens layer.

20. A method as recited in claim 16 wherein said lenticular split image has an edge and said method further comprises the step of depositing an extraordinarily thick ridge of ink along said edge.

* * * * *